(12) United States Patent
He et al.

(10) Patent No.: US 9,412,050 B2
(45) Date of Patent: Aug. 9, 2016

(54) PRODUCE RECOGNITION METHOD

(75) Inventors: Chao He, Causeway Bay (HK); Gary Ross, Angus (GB)

(73) Assignee: NCR Corporation, Duluth, GA (US)

( * ) Notice: Subject to any disclaimer, the term of this patent is extended or adjusted under 35 U.S.C. 154(b) by 1046 days.

(21) Appl. No.: 12/902,304

(22) Filed: Oct. 12, 2010

(65) Prior Publication Data
US 2012/0087547 A1    Apr. 12, 2012

(51) Int. Cl.
*G06K 9/00* (2006.01)
*G06K 9/62* (2006.01)

(52) U.S. Cl.
CPC ............ *G06K 9/629* (2013.01); *G06K 2209/17* (2013.01)

(58) Field of Classification Search
USPC .................. 382/110, 141, 155–161, 224–228; 235/440–473
See application file for complete search history.

(56) References Cited

U.S. PATENT DOCUMENTS

| | | | | |
|---|---|---|---|---|
| 3,822,015 A * | 7/1974 | Hsieh et al. | ............. | 209/173 |
| 4,884,696 A * | 12/1989 | Peleg | ............. | 209/545 |
| 5,546,475 A * | 8/1996 | Bolle et al. | ............. | 382/190 |
| 5,675,070 A * | 10/1997 | Gelperin | ............. | 73/23.34 |
| 5,867,265 A * | 2/1999 | Thomas | ............. | 356/328 |
| 6,069,696 A * | 5/2000 | McQueen et al. | ............. | 356/326 |
| 6,155,489 A * | 12/2000 | Collins et al. | ............. | 235/462.01 |
| 6,260,023 B1 * | 7/2001 | Seevers et al. | ............. | 705/20 |
| 6,296,186 B1 * | 10/2001 | Spencer et al. | ............. | 235/462.01 |
| 6,332,573 B1 * | 12/2001 | Gu et al. | ............. | 235/462.06 |
| 6,409,085 B1 * | 6/2002 | Gu | ............. | 235/462.11 |
| 6,457,644 B1 * | 10/2002 | Collins et al. | ............. | 235/462.14 |
| 6,471,125 B1 * | 10/2002 | Addy | ............. | 235/385 |
| 6,606,579 B1 * | 8/2003 | Gu | ............. | 702/181 |
| 6,668,078 B1 * | 12/2003 | Bolle et al. | ............. | 382/164 |
| 7,651,028 B2 * | 1/2010 | Knowles et al. | ............. | 235/462.41 |
| 2006/0086794 A1 * | 4/2006 | Knowles et al. | ............. | 235/454 |
| 2007/0012777 A1 * | 1/2007 | Tsikos et al. | ............. | 235/454 |
| 2008/0128509 A1 * | 6/2008 | Knowles et al. | ............. | 235/462.42 |
| 2009/0057395 A1 * | 3/2009 | He et al. | ............. | 235/379 |
| 2009/0150322 A1 * | 6/2009 | Bower et al. | ............. | 706/50 |
| 2010/0111383 A1 * | 5/2010 | Boushey et al. | ............. | 382/128 |
| 2010/0173269 A1 * | 7/2010 | Puri et al. | ............. | 434/127 |
| 2010/0206951 A1 * | 8/2010 | Herwig | ............. | 235/439 |
| 2011/0004574 A1 * | 1/2011 | Jeong et al. | ............. | 706/12 |
| 2011/0078033 A1 * | 3/2011 | Bravo | ............. | 705/21 |
| 2011/0129117 A1 * | 6/2011 | Ross et al. | ............. | 382/103 |
| 2011/0182477 A1 * | 7/2011 | Tamrakar et al. | ............. | 382/110 |
| 2011/0299765 A1 * | 12/2011 | Baker | ............. | 382/159 |
| 2013/0048722 A1 * | 2/2013 | Davis et al. | ............. | 235/383 |

* cited by examiner

*Primary Examiner* — Aaron W Carter
(74) *Attorney, Agent, or Firm* — Schwegman, Lundberg & Woessner

(57) ABSTRACT

A produce recognition method which uses hierarchical Bayesian learning and kernel combination, and which offers classification-oriented synergistic data integration from diverse sources. An example method includes providing a classifier having a plurality of inputs, each input being adapted to receive produce data of a different modality; mapping the produce data to the respective input of the classifier by a computer; for each input, independently operating on the data relating to that input to create a feature set by the computer; comparing each feature in the feature set to respective pre-trained data for that feature to produce a similarity description set; combining all similarity description sets using a dedicated weighting function to produce a composite similarity description by the computer; and deriving a plurality of class values from the composite similarity description to create a recognition result for the produce item by the computer.

18 Claims, 3 Drawing Sheets

PRODUCE RECOGNITION METHOD

BACKGROUND

One of the most frustrating problems facing grocery retailers is the lack of an automatic, accurate and efficient method to identify fruits and vegetables at the checkout lane. Many manual methods exist, but all are slow and inaccurate. The most common method involves consulting a printed list of all fruits and vegetables sold in a given store, to find their corresponding price codes.

Since the process is so inefficient, many cashiers simply guess at the price codes or simply memorize and use a small subset of common price codes—especially if there are long lines at the register. This means the retailer loses revenue if the item actually sold is a more expensive item. For this reason, speed and accuracy are both important. In a self-service checkout transaction, customers often guess or sometimes deliberately defraud the system.

A successful automatic produce recognition system needs to solve two challenges: (1) select appropriate and discriminative features (for example shape, size, color, aroma, and the like) for produce modeling; and (2) build an efficient and robust classifier.

There have been attempts at solving this problem, including analysis of spectral response of reflected light, analysis of camera images, and analysis of produce aromas but these attempts have proven unreliable at consistently identifying some items.

Since it is unlikely that any one approach will be sufficient to guarantee accurate recognition of all items, recognition methodologies have been combined. However, increasing the number of different kinds of recognition methodologies complicates classifier design.

For example, a spectral-based methodology may use a distance-measure-based Gaussian density classifier with checkout frequency. Image-based methodologies may use a nearest neighbor classifier. Both methodologies are simple and easy to update, but they treat all features equally and independently. These simplistic assumptions do not reflect reality, where signals are correlated (not independent), and not all features are equally important. Some features are more important and provide better accuracy for produce recognition than others. Finally, these classifiers have inputs that are specifically configured for the type of feature used, and may not be suitable for use with a feature provided by a future sensor or technology.

It would be desirable to provide a produce recognition method which addresses these concerns.

SUMMARY

A produce recognition method is provided. The produce recognition method uses hierarchical Bayesian learning and kernel combination, and offers classification-oriented synergistic data integration from diverse sources.

An example method includes providing a classifier having a plurality of inputs, each input being adapted to receive produce data of a different modality; mapping the produce data to the respective input of the classifier by a computer; for each input, independently operating on the data relating to that input to create a feature set by the computer; comparing each feature in the feature set to respective pre-trained data for that feature to produce a similarity description set; combining all similarity description sets using a dedicated weighting function to produce a composite similarity description by the computer; and deriving a plurality of class values from the composite similarity description to create a recognition result for the produce item by the computer.

The method can be applied in many different environments. For example, the method can be applied in a transaction environment involving recognition and sale of produce items.

DETAILED DESCRIPTION

Figure 1:
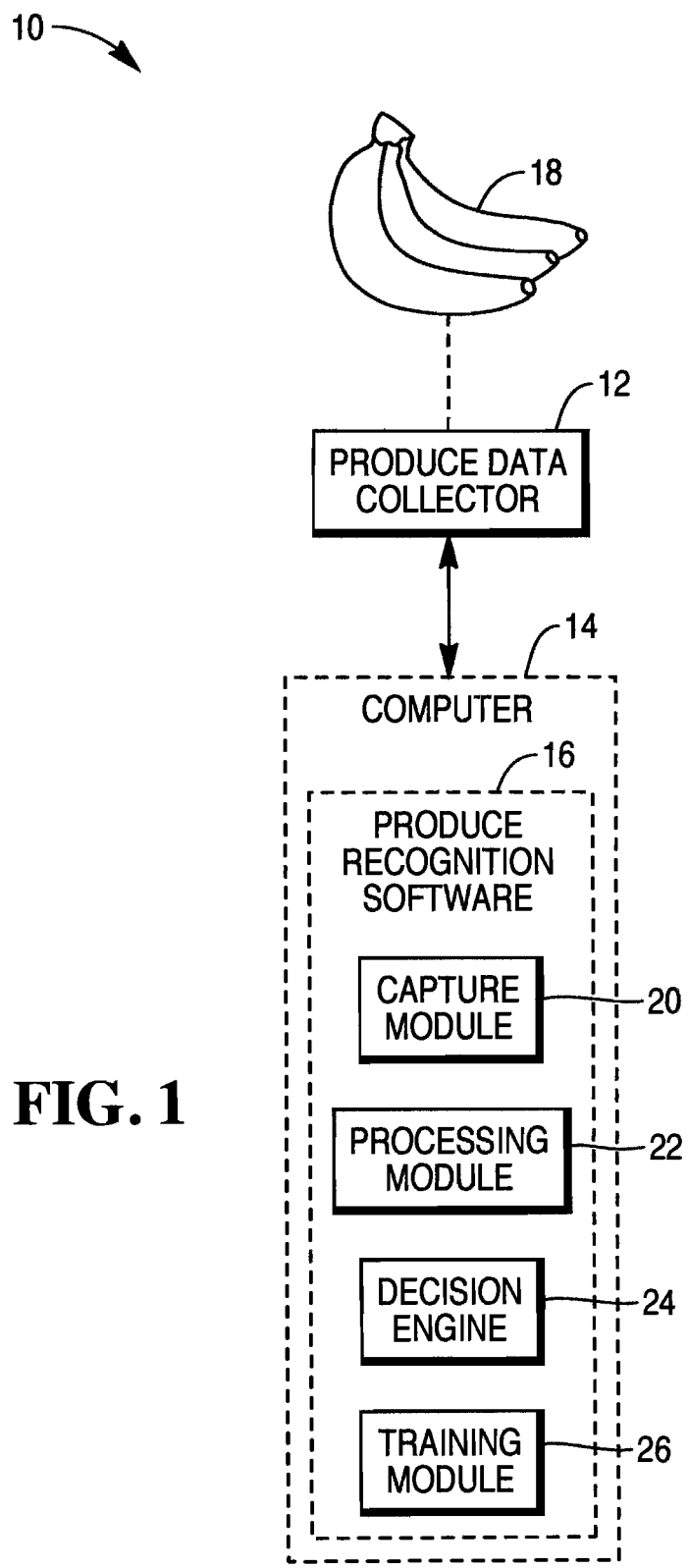
FIG. 1 illustrates an example produce recognition system.

Referring now to FIG. 1, produce recognition system 10 includes produce data collector 12.

Produce data collector 12 collects data about produce item 18. Produce data collector 12 may represent a single data collector which captures a plurality of different features of produce item 18, or a plurality of different data collectors which capture the plurality of different features. Produce data collector 12 may collect data using a plurality of different methodologies.

For example, produce data collector 12 may include a camera for capturing and providing images of produce item 18. The images may provide information about a plurality of different features, such as shape (2D or 3D), size, color, non-visible electromagnetic reflection and texture.

As another example, produce data collector 12 may include the camera above combined with an aroma sensor (sometimes referred to as an olfactory sensor) for capturing chemicals given off by produce item 18 and for providing a chemical signature.

As another example, produce data collector 12 may include the camera above combined with a scale for providing a weight and density of produce item 18.

As another example, produce data collection 12 may include the camera above combined with a thermal sensor for capturing information related to the internal structure and composition of produce item 18.

Features of produce item 18 may include any of number, weight, density, color, color variation, non-visible electromagnetic reflection, size, shape (2D or 3D), texture, aroma, and internal structure and composition. The features may also include other features captured using collectors and sensor or technologies yet to be discovered.

Produce data collector 12 may prove useful in a variety of different environments, such as a retail point-of-sale (POS) environment. Produce data collector 12 may identify produce items 18 purchased during a transaction at a checkout system. For this purpose, the checkout system may be an assisted-service checkout system or a self-service checkout system.

As another example, produce data collector 12 may be incorporated into a produce selection system in a produce section of a grocery store.

As another example, produce data collector 12 may be incorporated into a produce freshness system in a grocery or grocery supplier, for additionally providing information for indicating freshness.

Produce data collector 12 may be combined or integrated into other peripherals. For example, produce data collector 12 may be incorporated into a barcode reader. An example checkout device may include one that is disclosed in U.S. Pat. No. 6,457,644. This patent is hereby incorporated by reference.

Produce recognition system 10 further includes computer 14, which executes produce recognition software 16.

Produce recognition software 16 includes capture module 20, processing module 22, decision engine 24, and training module 26.

Capture module 20 receives data about produce item 18 (referred to as "initial produce data") from produce data collector 12 and obtains produce features from this initial produce data. Capture module 20 then outputs the obtained produce features 30 to processing module 22.

Processing module 22 processes the obtained produce features to create feature data 30. For example, processing module 22 may process a captured image to extract color, shape, size, and texture information. Processing module 22 outputs the feature data to decision engine 24.

Decision engine 24 uses a classifier (described in more detail below) to identify produce item 18 using the feature data received from processing module 22.

The classifier used by decision engine 24 is a multi-class classifier comprising a hierarchy of kernels, wherein a composite kernel retains the dimensionality of base kernels from which the composite kernel is derived. The statistical models underlying this multi-class classifier have been described by the assignee of the present application in application Ser. No. 11/899,381, filed Sep. 5, 2007, and published Mar. 5, 2009, as publication number 2009/0057395. This published U.S. patent application is hereby incorporated by reference.

Training module 26 is used to train decision engine 24, in particular, to configure parameters used by decision engine 24.

Produce recognition software 16 may obtain other data from other sources or derive other data to assist with recognition. For example, in a POS environment, other data may include purchase frequency information associated with each of produce items 18, where likelihood of purchase is used as a predictor of produce identity.

In some environments, produce recognition software 16 may be combined with other software or complete additional tasks. For example, in a POS environment, produce recognition software 16 may work in combination with POS transaction software to display a candidate identity of produce item 18 for operator verification, to obtain a price, such as a price per unit weight, from a price look-up (PLU) data file, and to obtain payment for produce item 18.

Computer 14 includes a processor and memory, executes an operating system such as a Microsoft operating system, and may include a display, an input device, and other peripherals tailored to its environment. For example, in a POS environment, computer 14 may be coupled to one or more of a barcode reader, card reader, printer, cash drawer, cash money dispenser, and cash money acceptor.

Computer 14 may include a client computer or a server computer. Computer 14 may include one or more computers at the same or different locations.

Figure 2:
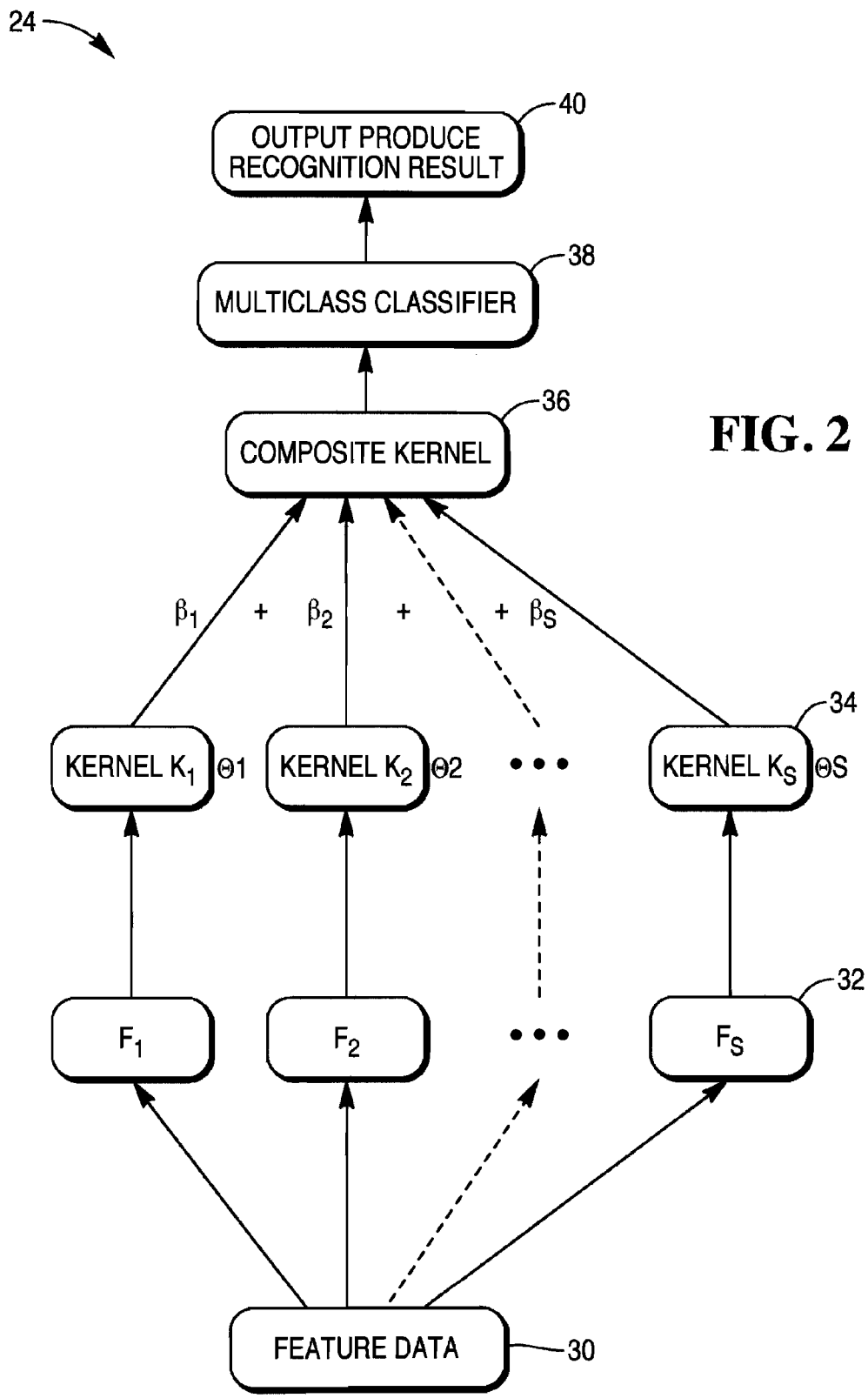
FIG. 2 is an example decision engine for recognizing a produce item.

Turning now to FIG. 2, decision engine 24 uses hierarchical Bayesian learning. Decision engine 24 is a multinomial probit classifier with a composite kernel (composite similarity description), which offers classification-oriented synergistic integration of diverse feature data and which can be applied to any type or source of feature data.

The theoretical basis and the mathematical formulae for decision engine 24 have been applied to the problem of ATM fraud by the assignee of the present application and are disclosed in application Ser. No. 11/899,381, filed Sep. 5, 2007, and published Mar. 5, 2009, as publication number 2009/0057395. This published U.S. patent application is hereby incorporated by reference.

Training Mode

Training module 26 is only used when produce recognition software 16 is operating in training mode; that is, not when the produce recognition software 16 is being operated by a customer, cashier, or other operator.

For each single type (class or identity) of produce item 18 to be recognized by system 10, training module 26 captures data from multiple items of the same type, with as many variations of each type of produce item as possible. Training optimizes the parameters used by decision engine 24, such as $\theta$ and $\beta$, and other parameters.

For example, if the decision engine 24 is to be trained to recognize bananas, then training module 26 captures variations in numbers of bananas in a bunch, variations in sizes of bananas, variations in colors of bananas (for example, from light yellow to light brown), variations in shapes (curvature) of bananas, and the like.

Some produce items may need to be recognized not just based upon type, but also variety. For example, a produce type may be "apple", and a variety may be "Golden Delicious", "Discovery", or the like. Training module 26 captures variations in variety.

Training may also include varying environmental factors around produce item 18, such as background light, humidity, and the like. This may be useful where the specific equipment in use rely on such environmental factors. For example, the intensity of background light may be important for some imaging techniques when they are applied to produce recognition.

Operational Mode

Decision engine 24 receives feature data 30 from processing module 22. Feature data 30 include a plurality of different types of feature information $F_1 \ldots F_s$, such as color and non-visible EM data, size, shape (2D or 3D), internal structure and composition, aroma, weight, and density. Feature information may come from one or more collector sources. In this embodiment, feature data 30 is supplied by produce data collector 12.

The different types (or modalities) of feature information (from the feature data 30) are organized or separated into different inputs (feature inputs) as feature spaces 32.

Each feature input ($F_i$, $i \in 1, \ldots, S$) from features spaces 32 is embedded into a corresponding kernel (similarity measurement) space 34 ($F_i$, $i \in 1, \ldots, S$) according to a unique set of mapping parameters $\theta_i$ ($i \in 1, \ldots, S$). In other words, each feature input is operated on by a respective kernel $K_i$ ($i \in 1, \ldots, S$) to obtain a similarity measure between the produce item 18 and the possible identities derived from training and used by decision engine 24 in every feature space 32.

Each kernel may have a unique weighting parameter $\beta_i$ ($i \in 1, \ldots, S$) determined by the dedicated weighing function. The values of the weighting parameters indicate how important each feature will be in classifying inputs to them. Weighted kernels are combined to create a composite kernel 36, which is the combined similarity measures between produce item 18 and the possible identities used by decision engine 24.

Composite kernel 36 is then operated on by multiclass classifier 38. Multiclass classifier 38 is a multinomial regression based model, which produces a predictive output recognition result 40 or identity for produce item 18, disregarding the numbers and types of feature inputs. Multiclass classifier 38 produces recognition results for each possible identity of produce item 18 used by decision engine 24.

Multiclass classifier 38 may use a different set of regression parameters to calculate a probability for each possible identity of produce item 18, where the higher the probability value, the more likely the associated identity prediction is the item.

The various parameters (such as θ and β) can be obtained from a training set using, for example, Gibbs sampling or a Variational Bayes Approximation, as described in more detail under the "Theoretical Considerations" section in the incorporated by reference application having publication number 2009/0057395.

Figure 3:
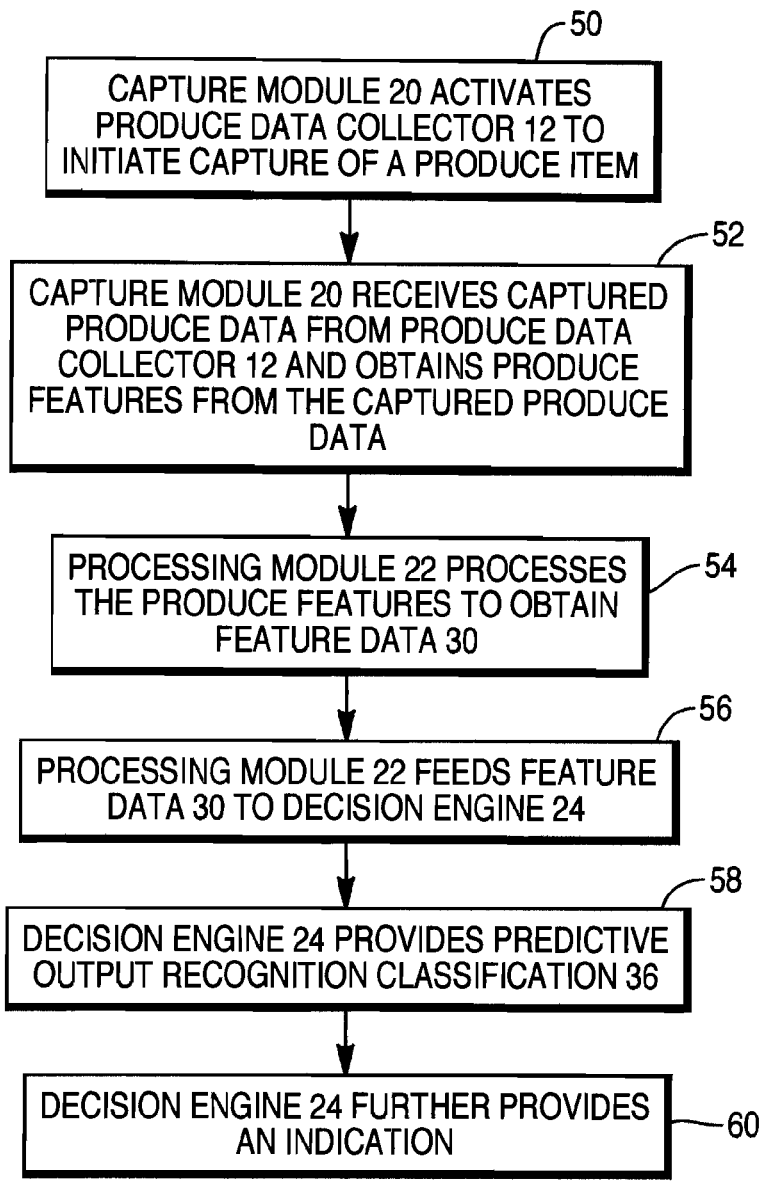
FIG. 3 is an example produce recognition method.

With reference to FIG. 3, general operation of produce recognition software 16 is illustrated.

In step 50, capture module 20 activates produce data collector 12 to initiate capture of a produce data. For example, capture module 20 may activate produce data collector 12 under operator control. As another example, capture module 20 may activate produce data collector 12 when produce item 18 is placed on a scale. As another example, capture module 20 may activate produce data collector 12 in response to operator-initiated commands.

In step 52, capture module 20 receives captured produce data from produce data collector 12 and obtains produce features from this initial produce data.

In step 54, processing module 22 processes these produce features as necessary to create feature data 32. For example, processing module 22 may process a captured image to extract color, shape, size, and texture information.

In step 56, processing module 22 feeds feature data 30 into decision engine 24, which is split into a plurality of feature inputs.

In step 58, decision engine 24 provides a predictive output recognition result 40 by applying the configuration parameters (established through the training process) to the feature inputs using the statistical model referenced above.

In step 60, decision engine 24 further provides an indication according to its environment. For example, decision engine 24 may display an image associated with predictive output recognition result 40. This may enable a cashier to verify that decision engine 24 has correctly recognized produce item 18. Decision engine 24 may additionally display information derived from captured information, such as freshness information.

Although particular reference has been made to certain embodiments, variations and modifications are also envisioned within the spirit and scope of the following claims.

What is claimed is:

1. An automatic method of recognizing at a checkout system a produce item different from a number of different produce items to be sold, the method comprising:
    pre-training a multinomial regression based model with variations in sizes, shapes, colors, types, thermal data, and aroma data for a training set of produce items, and pre-training the multinomial regression based model with environmental factors present during the pre-training including with the environmental factors at least one factor for background lighting and at least another factor for humidity;
    providing a single classifier having a plurality of inputs, each input being adapted to receive produce data of a different modality, wherein at least one modality relevant to thermal information captured for the produce item, the thermal information providing data relevant to an internal structure and composition of the produce item, and wherein at least another modality relevant to aroma information captured as chemicals given off by the produce items and the aroma information provided by an olfactory sensor, the aroma information relevant to chemical signatures for the produce items;
    mapping the produce data to the respective input of the classifier by a computer executing produce recognition software;
    for each input, independently operating on the data relating to that input to create a feature set by the computer;
    comparing each feature in the feature set to respective pre-trained data for that feature to produce a similarity description set by the computer;
    combining all similarity description sets using a dedicated weighting function to produce a composite similarity description by the computer; and
    deriving a plurality of class values from the composite similarity description to create a recognition result for the produce item by the computer by processing the multinomial regression based model and producing an identity for the produce item.

2. The method according to claim 1, wherein the providing step comprises providing a Bayesian model as the classifier.

3. The method according to claim 1, wherein the providing step comprises providing a classifier with parameters derived from training involving capturing features of multiple other produce items of similar type as the one produce item.

4. The method according to claim 1, wherein the mapping step comprises utilizing kernel techniques to create the similarity description set.

5. The method according to claim 1, wherein the combining step comprises accessing an optimized weighting parameter for each of the feature similarity description sets to create the composite similarity description by the computer.

6. The method according to claim 1, wherein the deriving step comprises using regression techniques to derive the plurality of class values by the computer.

7. A method of automatically recognizing at a checkout system a produce item from a number of produce items to be sold comprising:
    pre-training a multinomial regression based model with variations in sizes, shapes, colors, types, thermal data, and aroma data for a training set of produce items, and pre-training the multinomial regression based model with environmental factors present during the pre-training including with the environmental factors at least one factor for background lighting and at least another factor for humidity;
    capturing features of multiple other produce items of similar type as the one produce item by a single produce data collector and capturing at least one feature as thermal information for the one produce item, the thermal information providing data relevant to an internal structure and a composition of the one produce item and capturing at least one other feature as aroma information captured as chemicals given off by the produce items and the aroma information provided by an olfactory sensor, the aroma information relevant to chemical signatures for the produce items;
    determining parameters based upon the features of the multiple other produce items by a computer executing produce recognition software;
    providing a decision engine including a Bayesian classifier configured with the parameters and having a plurality of inputs, each input being adapted to receive produce data of a different modality captured from the produce item by a produce data collector comprising a camera and a scale;
    mapping the produce data to the respective input of the classifier by the computer;

for each input, independently operating on the data relating to that input to create a feature set by the computer;

comparing each feature in the feature set to respective pre-trained data for that feature to produce a similarity description set by the computer;

combining all similarity description sets using a dedicated weighting function to produce a composite similarity description by the computer; and deriving a plurality of class values from the composite similarity description to create a recognition result for the produce item by the computer by processing the multinomial regression based model and producing an identity for the one produce item.

8. The method according to claim 7, further comprising providing an indication of the identity of the produce item to an operator by the computer.

9. The method according to claim 8, further comprising providing multiple identity predictions and probabilities and ranking them according to the probabilities for the operator by the computer.

10. An automatic produce recognition system at a checkout system for recognizing a produce item from a number of different produce items to be sold, the produce recognition system comprising:

a single produce data collector; and a computer for controlling the produce data collector, the computer including a decision engine including a classifier having a plurality of inputs, each input being adapted to receive produce data of a different modality, and wherein at least a portion of the produce data includes a chemical signature and wherein at least another portion of the data includes thermal information captured for the produce item, the thermal information providing data relevant to an internal structure and composition of the produce item, and wherein still another portion of the data includes aroma information captured as chemicals given off by the produce item and the aroma information provided by an olfactory sensor, the aroma information relevant to a chemical signature for the produce item;

wherein the computer also for pre-training a multinomial regression based model with variations in sizes, shapes, colors, types, thermal data, and aroma data for a training set of produce items, and pre-training the multinomial regression based model with environmental factors present during the pre-training including with the environmental factors at least one factor for background lighting and at least another factor for humidity;

wherein the computer is additionally for mapping the produce data to the respective input of the classifier; for each input, independently operating on the data relating to that input to create a feature set; comparing each feature in the feature set to respective pre-trained data for that feature to produce a similarity description set; combining all similarity description sets using a dedicated weighting function to produce a composite similarity description; and deriving a plurality of class values from the composite similarity description to create a recognition result for the produce item by processing the multinomial regression based model and producing an identity for the produce item.

11. A transaction system employing an automatic produce recognition system to recognize a product item from a number of different produce items to be sold, comprising:

a single produce data collector comprising a camera and a scale; and a computer executing produce recognition software and controlling the produce data collector, the computer including a decision engine including a classifier having a plurality of inputs, each input being adapted to receive produce data of a different modality, at least one modality relevant to thermal information captured for the produce item, the thermal information providing data relevant to an internal structure and composition of the produce item, and wherein at least another modality relevant to aroma information captured as chemicals given off by the produce item and the aroma information provided by an olfactory sensor, the aroma information relevant to a chemical signature for the produce item;

wherein the computer also for pre-training a multinomial regression based model with variations in sizes, shapes, colors, types, thermal data, and aroma data for a training set of produce items, and pre-training the multinomial regression based model with environmental factors present during the pre-training including with the environmental factors at least one factor for background lighting and at least another factor for humidity;

wherein the computer is additionally for mapping the produce data to the respective input of the classifier; for each input, independently operating on the data relating to that input to create a feature set; comparing each feature in the feature set to respective pre-trained data for that feature to produce a similarity description set; combining all similarity description sets using a dedicated weighting function to produce a composite similarity description; deriving a plurality of class values from the composite similarity description to create a recognition result for the produce item by processing the multinomial regression based model and producing an identity for the produce item; determining a price of the produce item; and for recording payment for the produce item.

12. The transaction system according to claim 11, wherein the computer comprises a self-service computer.

13. The method according to claim 1, wherein the checkout system is in a point of sale environment, and the method further comprises:

obtaining purchase frequency information associated with each of the number of different produce items; and utilizing the purchase frequency information as a predictor of produce identity.

14. The method according to claim 1, wherein the checkout system is in a point of sale environment, and the produce recognition software works in combination with point of sale transaction software; and the method further comprises:

displaying a candidate identity for the produce item for operator verification.

15. The method of claim 1, further comprising:

operating the produce recognition software in a training mode; and capturing data from multiple items of produce of the same type to provide training data.

16. The method of claim 1, wherein the recognition result includes both a type of produce and a variety of produce.

17. The method of claim 1, wherein the feature set comprises:

color, size, shape and weight.

18. The method of claim 17, wherein the feature set further comprises:

non-visible electromagnetic data, aroma, and density.

* * * * *